United States Patent [19]

Meyer et al.

[11] Patent Number: 5,736,585
[45] Date of Patent: Apr. 7, 1998

[54] MOLDINGS FOR PACKAGING, AND PROCESS FOR THE PRODUCTION THEREOF

[75] Inventors: Harald Meyer, Bickenbach; Hans Bössler; Josef Scherer, both of Worms, all of Germany

[73] Assignee: Merck Patent Gesellschaft mit beschrankter Haftung, Darmstadt, Germany

[21] Appl. No.: 793,696

[22] PCT Filed: Jun. 18, 1996

[86] PCT No.: PCT/EP96/02621

§ 371 Date: Feb. 27, 1997

§ 102(e) Date: Feb. 27, 1997

[87] PCT Pub. No.: WO97/01425

PCT Pub. Date: Jan. 16, 1997

[30] Foreign Application Priority Data

Jun. 29, 1995 [DE] Germany ................ 195 23 629.7

[51] Int. Cl.$^6$ .................. C08J 9/232; C08J 9/24; C08J 9/33; C08J 9/35
[52] U.S. Cl. .................. 521/47; 521/54; 521/59; 521/60; 521/134; 521/143; 264/DIG. 7
[58] Field of Search .................. 521/47, 54, 59, 521/60, 143, 134

[56] References Cited

U.S. PATENT DOCUMENTS

| | | | |
|---|---|---|---|
| 4,013,616 | 3/1977 | Wallace | 521/47 |
| 4,104,206 | 8/1978 | Hachiu et al. | 521/47 |
| 4,123,584 | 10/1978 | Brewton | 521/47 |

*Primary Examiner*—Morton Foelak
*Attorney, Agent, or Firm*—Millen, White, Zelane, & Branigan, P.C.

[57] ABSTRACT

The application relates to polyethylene and/or polypropylene foam moldings for packaging which consist of more than 50% of recycled material, and to a process for the production thereof.

12 Claims, No Drawings

MOLDINGS FOR PACKAGING, AND PROCESS FOR THE PRODUCTION THEREOF

The application relates to polyethylene and/or polypropylene foam moldings for packaging which consist of more than 50% of recycled material.

Polyethylene and in particular polypropylene foam moldings for packaging are enjoying increasing popularity and proliferation owing to their very good material properties, for example good impact absorption and resistance to solvents. Compared with polystyrene foam, their higher costs are disadvantageous for widespread use.

Under these circumstances and also in order to improve disposal of used packaging moldings, it is desirable to process the latter and to re-use them for the production of packaging moldings. Indeed, this is already done to a small extent. However, the fact that the material properties of recycled material are drastically reduced means that recycled material can only be used in maximum amounts of 20–30%.

The object was therefore to improve the processing and recycling of used polyethylene and/or polypropylene foam moldings in such a way that moldings having good material properties, even when they contain high proportions of recycled material, can be produced.

This object is achieved by the present invention.

The invention therefore relates to a process for the production of polyethylene and/or polypropylene foam moldings for packaging, which is characterized in that the starting material consists of more than 50% of recycled material.

The invention also relates to polyethylene and/or polypropylene foam moldings for packaging which are characterized in that they comprise more than 50% of recycled material.

Crucial factors for these possibilities, which are surprising to the person skilled in the art, are both novel and modified process steps in the processing of the used material to give beads which can be employed in molding, and also in the production of the moldings themselves.

The used material is generally processed in such a way that a material with the highest possible type purity is obtained by removal of foreign substances. This material is first subjected to coarse comminution, for example in a shredder, and then ground under gentle conditions in a mill with interchangeable screens, so that the polymer foam beads which have been fused to form the moldings are removed from the composite with as little damage as possible and are recovered.

In spite of this gentle grinding, it is impossible to prevent the primary particles (polymer foam beads) from being attacked and suffering damaged surfaces. The irregular and rough surface formed seems to be partially responsible for the poor quality of moldings produced from recycled material. Surprisingly, it has now been found that thermal aftertreatment of the polymer foam beads obtained from recycling allows a significant improvement to be achieved. To this end, the material is agitated at an elevated temperature of about 40°–90° C. in a tank with rotating internals, resulting in smoothing of the bead surfaces.

The aim of this aftertreatment is to approximate the surface structure of the recycled material to that of virgin material. The result of the treatment is a significant improvement in the quality of moldings obtained from this material.

However, in order to obtain high-quality moldings, the bead processing conditions are preferably also modified.

The processing of virgin material generally commences with impregnation, i.e. charging with air at superatmospheric pressure, usually of from 2.5 to 3.5 bar. The material is then blown into the mold, where it is compressed mechanically, and finally fused by heat treatment, for example by the action of superheated steam.

The process conditions to be observed here, for example the pressures and temperatures to be used, depend on the materials to be processed, but are known to the person skilled in the art both for polyethylene and for polypropylene foam and can be obtained from relevant publications, for example the processing guidelines published by the raw material manufacturers, for example BASF AG (Ludwigshafen), Kaneka (Belgium) or JSP (Paris).

The novel process uses the same process steps, but, through crucial modifications of individual steps, allows materials having a high recycled material content to be used without any significant drop in quality.

One essential modification is that the nip width set during filling of the mold, which determines the compression path of the mold, is selected to be larger than for corresponding virgin material, i.e. the mechanical compression is greater than in the case of virgin material. Typical nip widths for virgin material are from about 5 to 10 mm, while nip widths of from about 5 to 35 mm, in particular from about 10 to 35 mm, are selected for the novel process.

Another essential modification is in the temperature used for the fusing. The temperatures usually used are about 110°–130° C. for virgin polyethylene foam material and about 130°–160° C. for virgin polypropylene foam material. By contrast, higher temperatures are used in the novel process, generally from about 120° to about 140° C. for polyethylene foam and from about 140° to about 180° C. for polypropylene foam.

This enables packaging moldings to be produced using up to 100% of recycled material without further additives or binders. The moldings produced in this way are preferably employed for disposable packaging.

We claim:

1. A process for the production of polyethylene and/or polypropylene foam moldings which comprises fusing in a mold polyethylene and/or polypropylene foam beads wherein more than 50% of said beads are recycled polyethylene and/or polypropylene foam beads.

2. The process of claim 1, wherein the recycled polyethylene and/or polypropylene foam beads are provided from a polyethylene and/or polypropylene foam molding material by precomminuting, grinding and dedusting of the material followed by aftertreating the polyethylene and/or polypropylene foam beads obtained therefrom at an elevated temperature to smooth the surface of the foam beads.

3. The process of claim 1, wherein the aftertreating is conducting by agitating the foam beads in a tank with rotating internals at a temperature of about 40°–90° C.

4. The process of claim 1, wherein the fusing in the mold is conducted at a relatively higher compression and relatively higher temperature than would be conventionally used if no recycled foam beads were used.

5. The process of claim 4, wherein the recycled foam beads are polyethylene, the nip width of the mold is from about 5 to 35 mm to provide the relatively higher compression and the temperature is about 120°–140° C.

6. The process of claim 4, wherein the recycled foam beads are polypropylene, the nip width of the mold is from about 5 to 35 mm to provide the relatively higher compression and the temperature is about 140°–180° C.

7. The process of claim 5, wherein the nip width is 10–35 mm.

8. The process of claim 6, wherein the nip width is 10–35 mm.

9. The process of claim 1, wherein the fusing in the mold is effected by action of superheated steam.

10. A polyethylene and/or polypropylene foam molding material prepared according to claim 1.

11. A polyethylene and/or polypropylene foam molding material comprising fused polyethylene and/or polypropylene foam beads wherein more than 50% of said beads are recycled polyethylene and/or polypropylene foam beads.

12. A process for the production of polyethylene and/or polypropylene foam moldings which comprises fusing in a mold polyethylene and/or polypropylene foam beads:

wherein more than 50% of said beads are recycled polyethylene and/or polypropylene foam beads, wherein the recycled polyethylene and/or polypropylene foam beads are provided from a polyethylene and/or polypropylene foam molding material by precomminuting, grinding and dedusting of the material followed by aftertreating the polyethylene and/or polypropylene foam beads obtained therefrom at an elevated temperature to smooth the surface of the foam beads, and wherein the fusing in the mold is conducted at a relatively higher compression and relatively higher temperature than would be conventionally used if no recycled foam beads were used.

* * * * *